US006692211B2

(12) United States Patent
Yuyama et al.

(10) Patent No.: US 6,692,211 B2
(45) Date of Patent: Feb. 17, 2004

(54) TRANSFUSION BOTTLE FEED APPARATUS

(75) Inventors: Shoji Yuyama, Toyonaka (JP); Tsuyoshi Kodama, Toyonaka (JP); Reiji Kitagawa, Toyonaka (JP)

(73) Assignee: Yuyama Mfg. Co., Ltd., Toyonaka (JP)

( * ) Notice: Subject to any disclaimer, the term of this patent is extended or adjusted under 35 U.S.C. 154(b) by 112 days.

(21) Appl. No.: 10/106,039

(22) Filed: Mar. 27, 2002

(65) Prior Publication Data

US 2002/0139810 A1 Oct. 3, 2002

(30) Foreign Application Priority Data

Mar. 30, 2001 (JP) ....................................... 2001-101972

(51) Int. Cl.[7] .................................................. B65G 1/12

(52) U.S. Cl. ........................ 414/278; 414/281; 414/268

(58) Field of Search ................................ 414/268, 278, 414/281, 222.01, 225.01, 226.02; 198/418.4, 435; 700/230; 221/95, 191

(56) References Cited

U.S. PATENT DOCUMENTS 4,108,333 A * 8/1978 Falk et al. .................... 221/13
4,389,157 A * 6/1983 Bernard, II et al. ........ 414/278
5,358,375 A * 10/1994 Kawada et al. ............. 414/277
5,533,606 A * 7/1996 Yuyama ...................... 198/349
5,599,154 A * 2/1997 Holscher et al. ............ 414/278
5,692,867 A * 12/1997 Kondo et al. ............... 414/268
5,832,693 A * 11/1998 Yuyama et al. ............... 53/168
5,860,784 A * 1/1999 Schuitema et al. ......... 414/280
5,919,025 A * 7/1999 Kimura et al. .............. 414/403
5,964,374 A * 10/1999 Yuyama et al. ............... 221/17
6,059,508 A * 5/2000 Wunscher et al. .......... 414/276
6,059,521 A * 5/2000 Rapeli ..................... 414/143.2
6,170,702 B1 * 1/2001 Zettler et al. ............... 221/192
6,325,586 B1 * 12/2001 Loy ........................... 414/281
6,478,137 B2 * 11/2002 Helels et al. ............ 198/347.1
6,616,010 B2 * 9/2003 Yuyama et al. ............. 221/197

FOREIGN PATENT DOCUMENTS

| | | |
|---|---|---|
| JP | 61-206708 | 9/1986 |
| JP | 61-273345 | 12/1986 |
| JP | 62-12507 | 1/1987 |
| JP | 2-60648 | 3/1990 |
| JP | 2-311979 | 12/1990 |
| JP | 3-32012 | 3/1991 |
| JP | 3-83701 | 4/1991 |
| JP | 3-88607 | 4/1991 |
| JP | 3-62786 | 6/1991 |
| JP | 3-97403 | 10/1991 |
| JP | 6-293402 | 10/1994 |
| JP | 6-339883 | 12/1994 |
| JP | 7-2313 | 1/1995 |
| JP | 7-88156 | 4/1995 |
| JP | 11-59814 | 3/1999 |

* cited by examiner

*Primary Examiner*—Douglas Hess
(74) *Attorney, Agent, or Firm*—Wenderoth, Lind & Ponack, L.L.P.

(57) ABSTRACT

The lifter 3 is moved upward until the storage shelf 2 on which the packaging box 9 that contains the transfusion bottles 13 corresponding to the prescription is stored. Then, the first conveyor mechanism 8 of the storage shelf 2 and the second conveyor mechanism 14 of the lifter 3 are driven to convey the packaging box 9 of the transfusion bottle 13 from the storage shelf 2 to the lifter 3. When the lifter 3 is moved downward to the lowermost position, the second conveyor mechanism 14 of the lifter 3 and the third conveyor mechanism 16 of the receiving table 4 are driven to convey the packaging box 9 of the transfusion bottle 13 from the lifter 3 to the receiving table 4. Subsequently, the grip mechanism 5 is driven to grip the transfusion bottle 13 in the packaging box 9 on the receiving table 4 and convey it to the collection container 20. Then, the transfusion bottle 13 is released above the collection container 20 and contained therein. Thus, the transfusion bottle 13 is collected with the simple mechanism operation and rapidly fed to a patient.

4 Claims, 5 Drawing Sheets

TRANSFUSION BOTTLE FEED APPARATUS

BACKGROUND OF THE INVENTION

The present invention relates to a transfusion bottle feed apparatus.

Conventionally, there have been proposed various kinds of transfusion bottle apparatuses in which a plurality of transfusion bottles are grouped by their kinds and stored in the apparatus body by putting the plurality of transfusion bottles on storage shelves so that the transfusion bottles can be collected in accordance with a prescription data and fed to a patient.

In the conventional transfusion bottle apparatuses, the transfusion bottles having a capacity of 100 ml more or less to be frequently used occupy the most part of storage shelves. Thus, many kind of the transfusion bottles can not be stored and therefore a plurality of same apparatuses must be installed. Further, since many kinds of transfusion bottles exist in admixture, a mechanism for conveying each transfusion bottle to a collection container is complicated, whereby it takes long time to collect the transfusion bottles.

Moreover, in the conventional transfusion bottle apparatuses, since the transfusion bottle is gripped and dropped into the collection container from a fixed height, when a small transfusion bottle having a capacity of 100 ml more or less is dropped, it damages the transfusion bottles previously collected in the collection container.

SUMMARY OF THE INVENTION

It is an object of the present invention to provide a transfusion bottle feed apparatus which can rapidly collect transfusion bottles with a simple conveying mechanism.

It is an another object of the present invention to provide a transfusion bottle feed apparatus which never damage the transfusion bottles.

In order to achieve the aforementioned objects, the present invention provides a transfusion bottle feed apparatuses in which a plurality of transfusion bottles are grouped by their kinds and stored in an apparatus body so that the transfusion bottles can be fed to a patient in accordance with a prescription data, comprising:

- a plural stages of storage shelves on which packaging boxes with the upper surface opened are put and stored, each of the packaging boxes contains same kind of the transfusion bottles, the packaging boxes in which same kind of the transfusion bottles are contained being put on the storage shelves in an up-and-down direction;
- a first conveyor mechanism provided on each of the storage shelves for conveying the packaging box of the transfusion bottle stored on the storage shelves;
- a lifter which can move upward and downward and can stop at the same levels as that of the storage shelves;
- a second conveyor mechanism provided on the lifter for receiving and conveying the packaging box of the transfusion bottle conveyed from the storage shelves by the first conveyor mechanism;
- a receiving table positioned at the same level of that of the lifter which moved downward to the lowermost position;
- a third conveyor mechanism provided on the receiving table for receiving and conveying the packaging box of the transfusion bottle conveyed from the lifter by the second conveyor mechanism; and

- a grip mechanism for gripping the transfusion bottle in the packaging box positioned on the receiving table, conveying to a collection container, releasing the transfusion bottle above the collection container to contain it therein.

In the present invention having above construction, the lifter is moved upward until the storage shelf on which the packaging box that contains the transfusion bottles corresponding to the prescription is stored. Then, the first conveyor mechanism of the storage shelf and the second conveyor mechanism of the lifter are driven to convey the packaging box of the transfusion bottle from the storage shelf to the lifter. When the lifter is moved downward to the lowermost position, the second conveyor mechanism of the lifter and the third conveyor mechanism of the receiving table are driven to convey the packaging box of the transfusion bottle from the lifter to the receiving table. Subsequently, the grip mechanism is driven to grip the transfusion bottle in the packaging box on the receiving table and convey it to the collection container. Then, the transfusion bottle is released above the collection container and contained therein. Thus, the transfusion bottle is collected with the simple mechanism operation and rapidly fed to a patient.

Preferably, the grip mechanism is provided with a tilting mechanism for tilting the transfusion bottle gripped by the grip mechanism; and the gripping mechanism moves downward until the transfusion bottle tilted by the tilting mechanism comes into contact with the bottom of the collection container and releases the transfusion bottle to move in the horizontal direction. Thus, the transfusion bottle falls down with the inclined state, reducing the impact and preventing the transfusion bottles below from being damaged.

Preferably, the receiving table is slidable toward an opening of the apparatus body; and at the position where the receiving table is slid to the opening of the body apparatus, the third conveyor mechanism discharges the empty packaging box on the receiving table through the opening of the apparatus body. Thus, the packaging box with no transfusion bottle can be easily taken out. In this case, providing a lever for kicking the rear portion of the empty packaging box upward allows the packaging box to be easily discharged through the opening of the apparatus body.

BRIEF DESCRIPTION OF THE DRAWINGS other objects and features of the present invention will become clear from the following detail description with reference to the accompanying drawings in which.

DETAILED DESCRIPTION OF THE PREFERRED EMBODIMENTS

Figure 1:
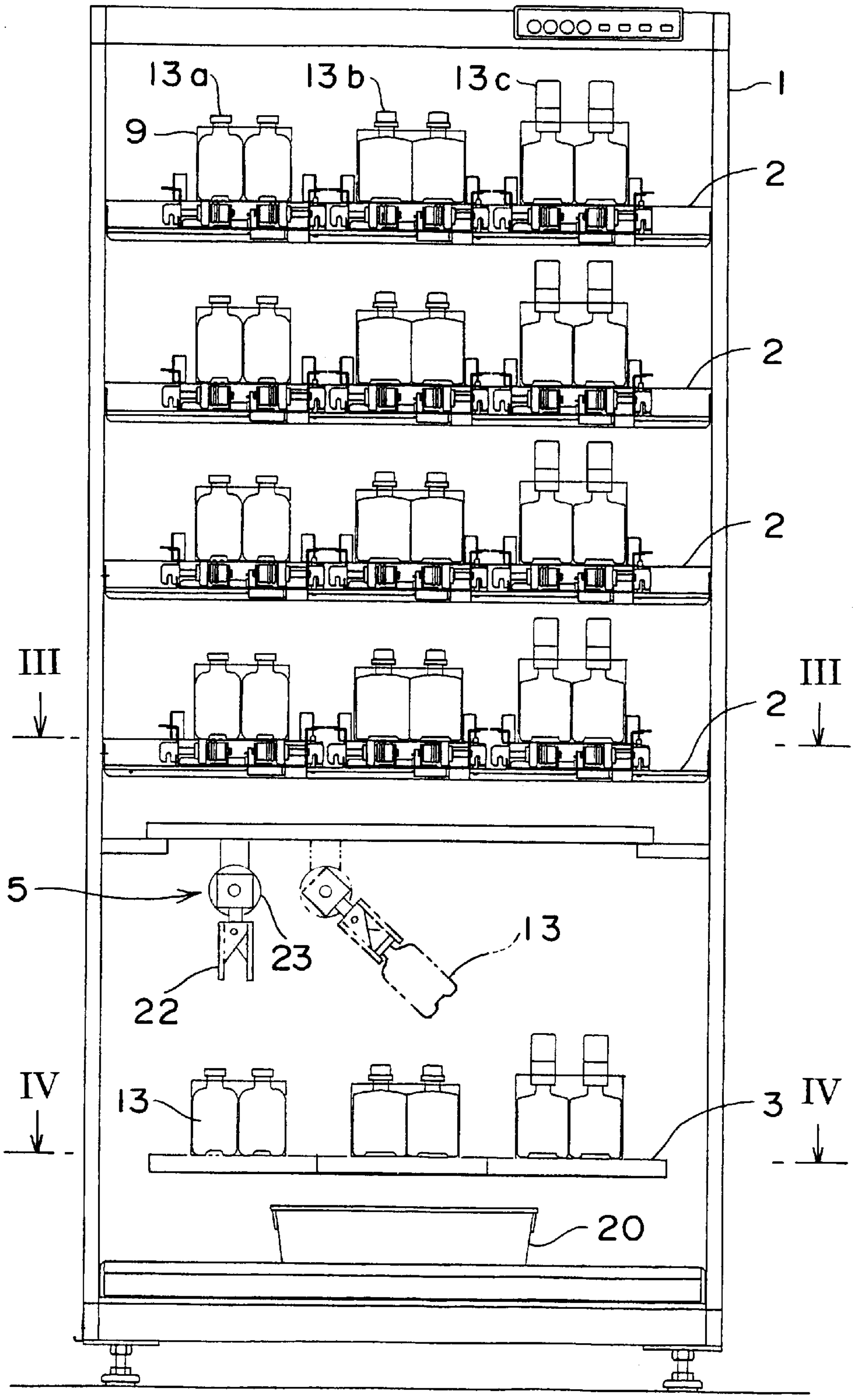
FIG. 1 is a front view showing a transfusion bottle feed apparatus according to the present invention.
Figure 2:
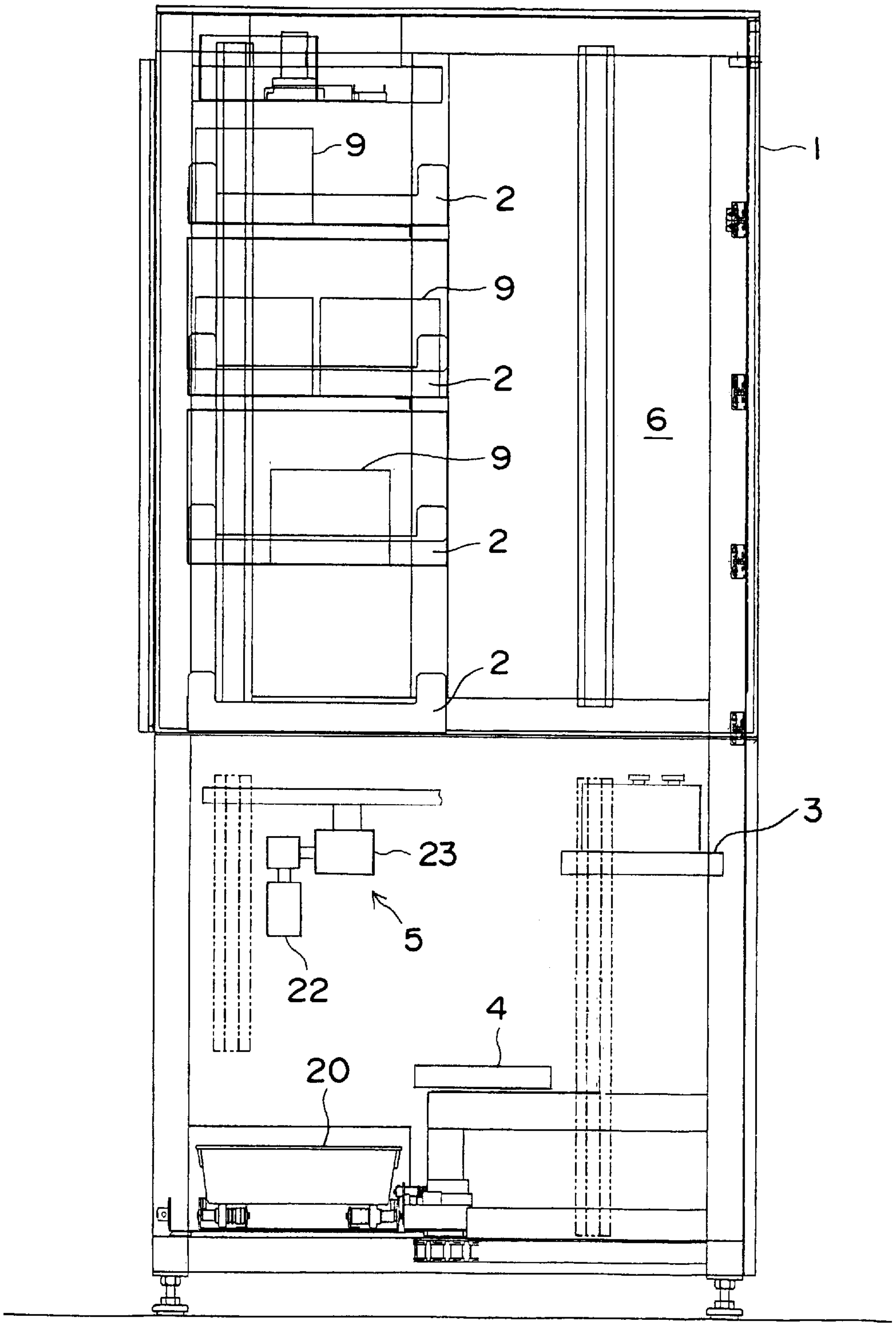
FIG. 2 is a side view of FIG. 1.

FIGS. 1 and 2 show a transfusion bottle feed apparatus according to the present invention. In the transfusion bottle feed apparatus, an apparatus body 1 having a rectangular frame is provided with a plural stages of storage shelves 2, a lifter 3, a receiving table 4 and a grip mechanism 5.

The storage shelves 2 are positioned at almost upper part of the apparatus body 1. Behind the storage shelves 2 is provided a lifting space 6 for the lifter 3 which will be explained hereinafter. At each storage section (three sections are shown in the figure) of the respective storage shelf 2, a plurality of conveyor rollers 8 (first conveyor mechanism) which are driven to rotate by a motor 7 are provided so that a packaging box 9 put on the plurality of conveyor rollers 8 can be conveyed in a back-and-forth direction of the apparatus body 1. Further, at both the front side of the conveyor roller 8 positioned at the foremost position and the rear side of the conveyor roller 8 positioned at the backmost position, stoppers 10, 11 are provided in order to prevent the packaging box 9 from dropping off. The rear stopper 11 is arranged so as to be horizontally laid by a motor 12.

On each storage shelf 2, the packaging boxes 9 in each of which the same kind of the transfusion bottles 13 are contained are put and stored with the upper surface opened. In an up-and-down direction of the storage shelves 2, the packaging boxes 9 in which the same kind of the transfusion bottles 13 are contained are stored. Namely, in FIG. 1, the packaging boxes 9 in which "A" of the transfusion bottles 13*a* are contained are stored in the left column; the packaging boxes 9 in which "B" of the transfusion bottles 13*b* are contained are stored in the middle column; and the packaging boxes 9 in which "C" of the transfusion bottles 13*c* are contained are stored in the right column.

Figure 3:
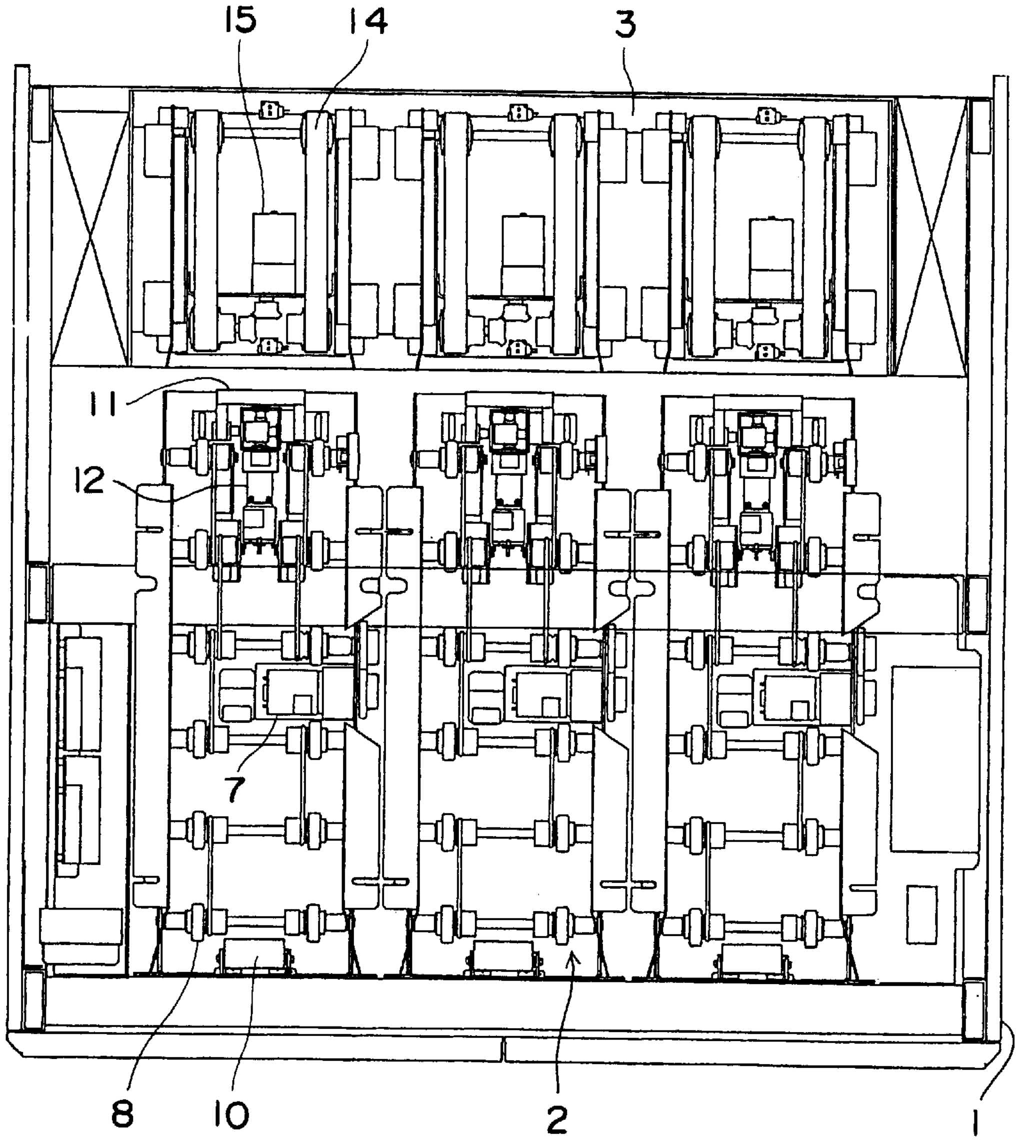
FIG. 3 is a sectional view taken along III—III line of FIG. 1.

The lifter 3 is arranged so that it can move upward and downward in the lifting space 6 behind the storage shelves 2 and can stop at the same levels as that of the storage shelves 2. On the lifter 3, as shown in FIG. 3, a plurality of conveyor belts 14 (second conveyor mechanism) the number of which corresponds to that of the storage sections of each storage shelf 2 are provided. Each of the conveyor belts 14 is driven to rotate by a motor 15 so that the packaging box 9 put on the conveyor belt 14 can be conveyed in the same direction as that of the conveyor rollers 8 of the storage shelf 2.

Figure 4:
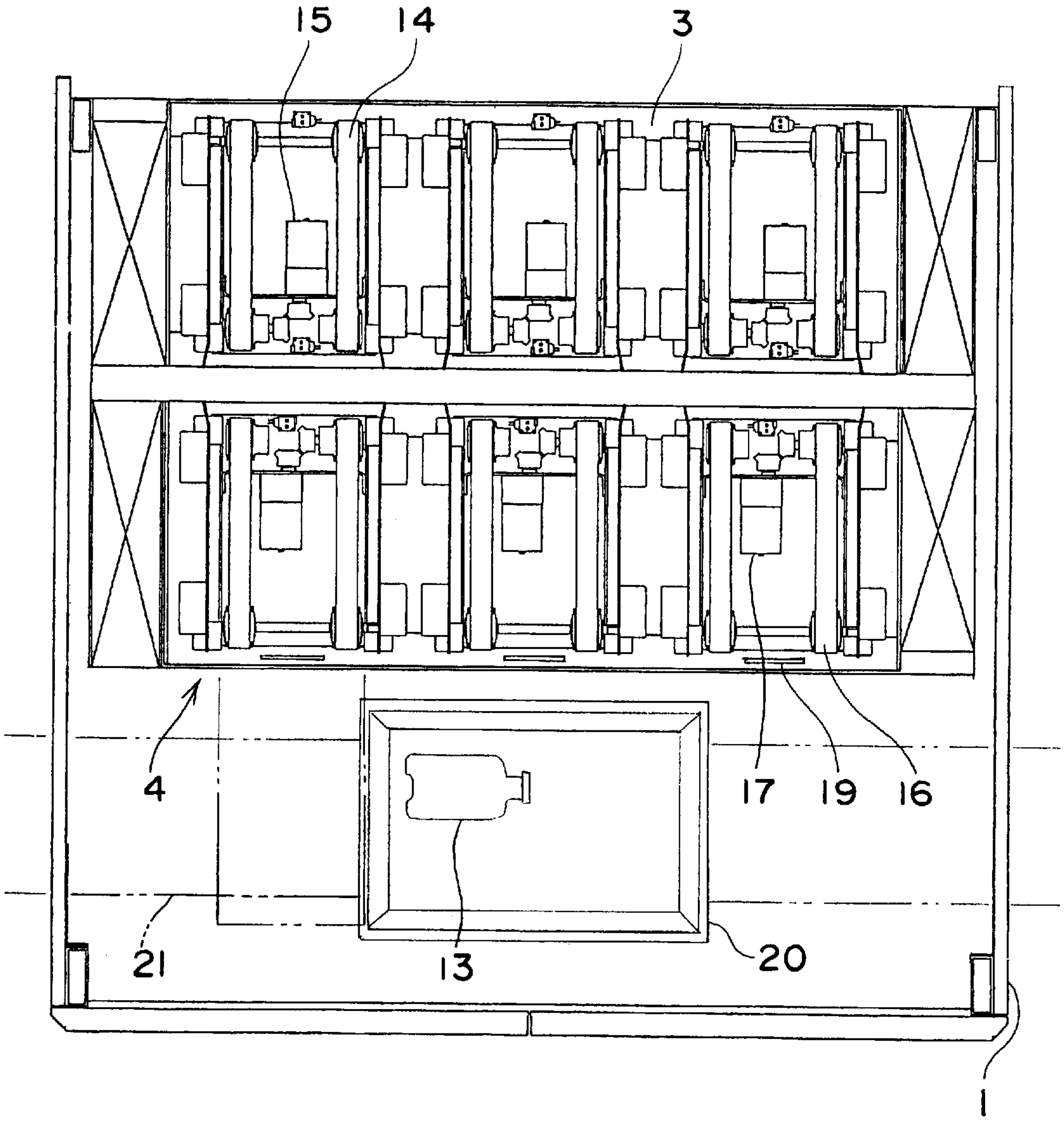
FIG. 4 is a sectional view taken along IV—IV line of FIG. 1.
Figure 5:
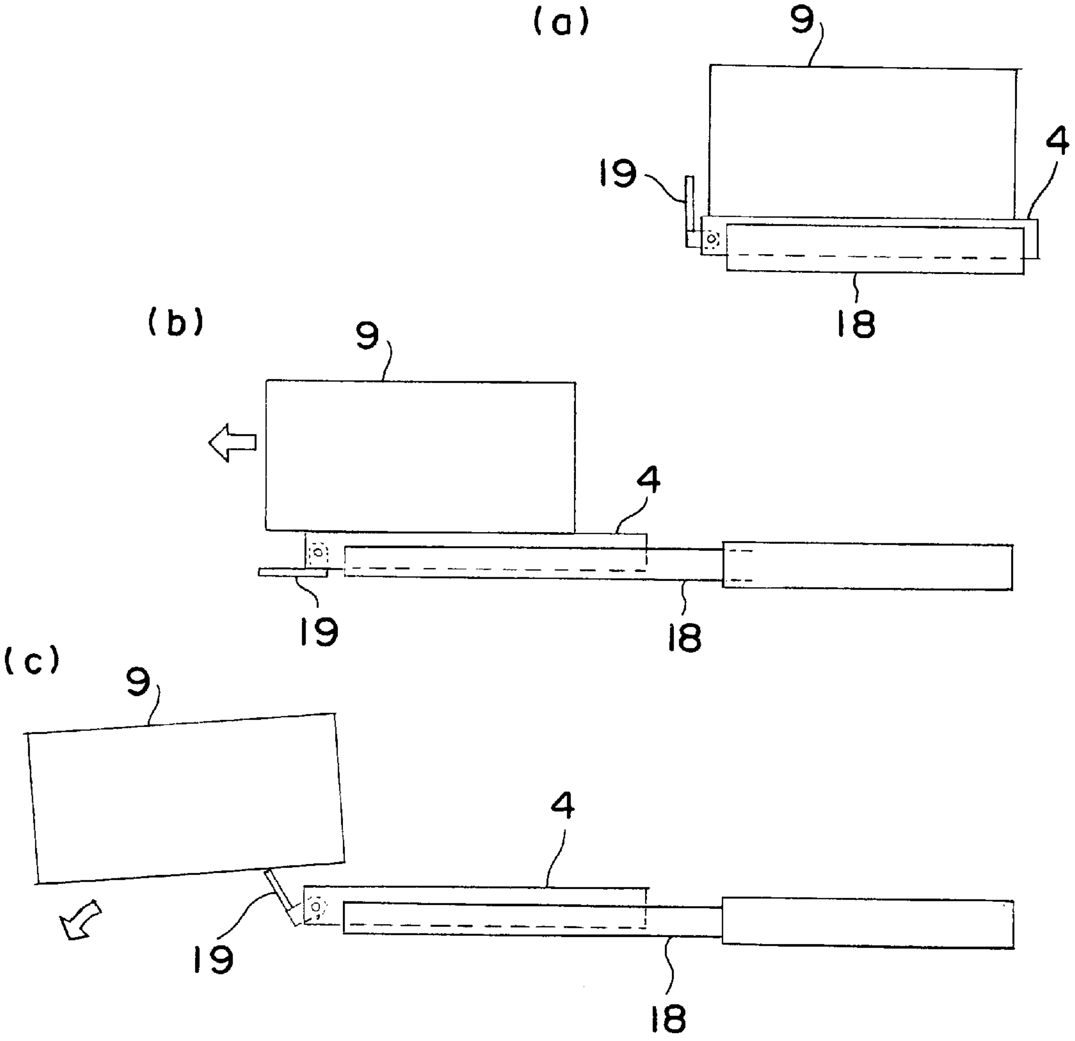
FIG. 5 is a side view showing a discharge operation of empty packaging box.

The receiving table 4, as shown in FIG. 4, is disposed at the same level as the lifter 3 moved downward to the lowermost position and at the front side of the liter 3. On the receiving table 4, a plurality of conveyor belts 16 (third conveyor mechanism) are provided in the same manner as the conveyor belts 14 of the lifter 3. Each of the conveyor belts 16 is driven to rotate by a motor 17 so that the packaging box 9 put on the conveyor belt 17 can be conveyed in the same direction as that of the conveyor belts 14 of the lifter 3. Further, the receiving table 4, as shown in FIG. 5, is slidably moved forward by a motor (not shown) on guide rails 18 toward an opening formed on the apparatus body 1. At the front portion of the receiving table 4, there are provided levers 19 each of which also serves as a stopper and each of which is arranged so as to be horizontally laid by a motor not shown.

At the front side of the receiving table 4, as shown in FIG. 4, there is disposed a conveyor path 21 which passes through the apparatus body 1 and on which a collection container 20 is conveyed in a left-and-right direction.

The grip mechanism 5, as shown in FIGS. 1 and 2, comprises a grip arm 22 which can grip and release the mouth portion of the transfusion bottle 13 from upward, a tilting mechanism 23 which can tilt the grip arm 22 by about 60 degrees, and a moving mechanism not shown which can move the grip arm 22 upward and downward and also move the grip arm 22 in both a back-and-forth direction and a left-and-right direction.

Operation of the transfusion bottle feed apparatus having aforementioned construction will be explained hereinafter.

When a prescription data is inputted to a control unit not shown of the transfusion bottle feed apparatus, the collection container 20 is conveyed on the conveyor path 21 and positioned in the transfusion bottle feed apparatus. Then, the lifter 3 is moved upward to the storage shelf 2 on which the packaging boxes 9 that contain the transfusion bottles 13 corresponding to the prescription are stored. The conveyor rollers 8 of the storage shelf 2 and the conveyor belts 14 of the lifter 3 are driven to convey the packaging box 9 of the transfusion bottle 13 from the storage shelf 2 to the lifter 3. Consequently, the lifter 3 is moved downward to the lowermost position. The conveyor belts 14 of the lifter 3 and the conveyor belts 16 of the receiving table 4 are driven to convey the packaging box 9 of the transfusion bottle 13 from the lifter 3 to the receiving table 4. Then, the grip mechanism 5 is driven to grip the transfusion bottle 13 within the packaging box 9 on the receiving table 4. The transfusion bottle 13 is moved to the collection container 20 and released above the collection container 20, whereby the transfusion bottle 13 is contained in the collection container 20. Thus, with the simple operation of the mechanisms, the transfusion bottle 13 is collected and rapidly fed.

When the transfusion bottle 13 is contained in the collection container 20, as shown in two-dots chain line in FIG. 1, the grip arm 22 is tilted by about 60 degrees by the tilting mechanism 23 of the grip mechanism 5 in a state that the grip arm 22 grips the transfusion bottle 13. With this state kept, the grip arm 22 is moved downward until the transfusion bottle 13 comes into contact with the bottom of the collection container 20. Then, the grip arm 22 releases the transfusion bottle 13 and retreats in a horizontal direction. Thus, the transfusion bottle 13 falls down with the inclined state, reducing the impact and preventing the transfusion bottles below from being damaged.

When the transfusion bottle 13 in the packaging box 9 becomes shortage, as shown in FIGS. 5(*a*) and 5(*b*), the receiving table 4 is slidably moved forward on the guide rails 18 toward the opening of the apparatus body 1, where the lever 19 is laid and the transfer belts 16 are driven to discharge the empty packaging box 9 on the receiving table 4 through the opening of the apparatus body 1. At this time, as shown in FIG. 5(*c*), when the lever 19 is rose up, the rear portion of the empty packaging box 9 is kicked upward, allowing the empty packaging box 9 to be easily discharged through the opening.

Although the present invention has been fully described by way of the examples with reference to the accompanying drawing, it is to be noted that here that various changes and modifications will be apparent to those skilled in the art. Therefore, unless such changes and modifications otherwise depart from the spirit and scope of the present invention, they should be construed as being included therein.

What is claimed is:

1. A transfusion bottle feed apparatus in which a plurality of transfusion bottles are grouped by their kinds and stored in an apparatus body so that the transfusion bottles can be fed to a patient in accordance with a prescription data, comprising:

plural stages of storage shelves on which packaging boxes with the upper surface opened are put and stored, each of the packaging boxes contains same kind of the transfusion bottles, the packaging boxes in which same kind of the transfusion bottles are contained being put on the storage shelves in an up-and-down direction;

a first conveyor mechanism provided on each of the storage shelves for conveying the packaging box of the transfusion bottle stored on the storage shelves;

a lifter which can move upward and downward and can stop at the same levels as that of the storage shelves;

a second conveyor mechanism provided on the lifter for receiving and conveying the packaging box of the transfusion bottle conveyed from the storage shelves by the first conveyor mechanism;

a receiving table positioned at the same level of that of the lifter which moved downward to the lowermost position;

a third conveyor mechanism provided on the receiving table for receiving and conveying the packaging box of the transfusion bottle conveyed from the lifter by the second conveyor mechanism; and a grip mechanism for gripping the transfusion bottle in the packaging box positioned on the receiving table, conveying to a collection container, releasing the transfusion bottle above the collection container to contain it therein.

2. The transfusion bottle feed apparatus as in claim 1, wherein the grip mechanism is provided with a tilting mechanism for tilting the transfusion bottle gripped by the grip mechanism; and the gripping mechanism moves downward until the transfusion bottle tilted by the tilting mechanism comes into contact with the bottom of the collection container and releases the transfusion bottle to move in the horizontal direction.

3. The transfusion bottle feed apparatus as in claim 1, wherein the receiving table is slidable toward an opening of the apparatus body; and at the position where the receiving table is slid to the opening of the body apparatus, the third conveyor mechanism discharges an empty packaging box on the receiving table through the opening of the apparatus body.

4. The transfusion bottle feed apparatus as in claim 3, further comprising a lever for kicking the rear portion of the empty packaging box upward.

* * * * *

UNITED STATES PATENT AND TRADEMARK OFFICE

CERTIFICATE OF CORRECTION

PATENT NO. : 6,692,211 B2
DATED : February 17, 2004
INVENTOR(S) : Shoji Yuyama et al.

It is certified that error appears in the above-identified patent and that said Letters Patent is hereby corrected as shown below:

Title page,
Item [56], please add the following references:
-- References Cited, U.S. PATENT DOCUMENTS,
5,048,719 9/1991 Empl et al.

FOREIGN PATENT DOCUMENTS,

WO 00-34925 6/2000
FR 2699310 6/1994
WO 01-68484 9/2001
EP 1281638 2/2003 --
Item [57], ABSTRACT, "Custody Equipment", and insert -- vol. 15, no. 253 (M-1129), June 27, 1991. --; and "Tray Delivery Aparatus", and insert -- vol. 011, no. 039 (M-559), February 5, 1987. --

Column 2,
Line 47, please replace "other objects and features" with -- Other objects and features --.

Signed and Sealed this

Sixth Day of July, 2004

JON W. DUDAS
*Acting Director of the United States Patent and Trademark Office*